T. G. F. DOLBY.
Apparatus for Exhausting Air from Vessel.

No. 221,399.  Patented Nov. 11, 1879.

ATTEST:
Henry Pennington
John G. Chapman.

INVENTOR:
Thomas G. F. Dolby,
By his Attorneys:

UNITED STATES PATENT OFFICE

THOMAS G. F. DOLBY, OF LONDON, ENGLAND.

IMPROVEMENT IN APPARATUS FOR EXHAUSTING AIR FROM VESSELS.

Specification forming part of Letters Patent No. 221,399, dated November 11, 1879; application filed September 30, 1879.

*To all whom it may concern:*

Be it known that I, THOMAS G. F. DOLBY, of London, England, have invented certain new and useful Improvements in Apparatus for Exhausting Air from Cans, Jars, and other receptacles for food and other substances, of which the following is a specification.

My apparatus is intended more especially for exhausting air from such cans and receptacles as have their covers retained in place by atmospheric pressure alone.

Figure 1:
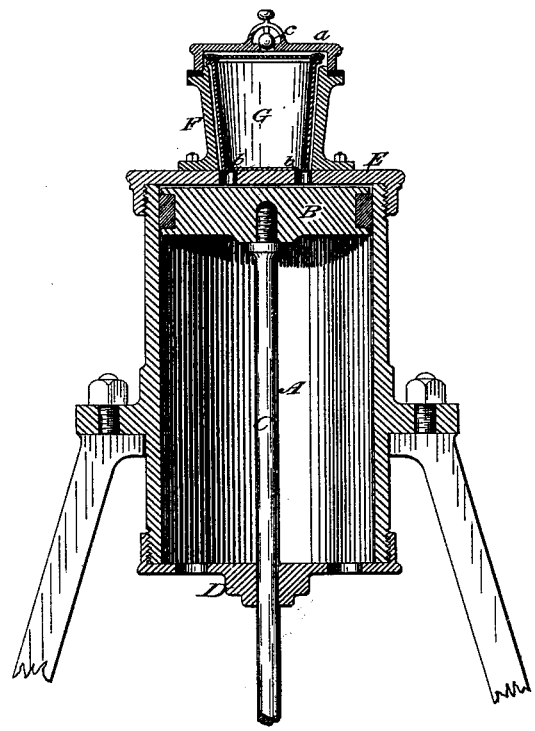
Figure 2:
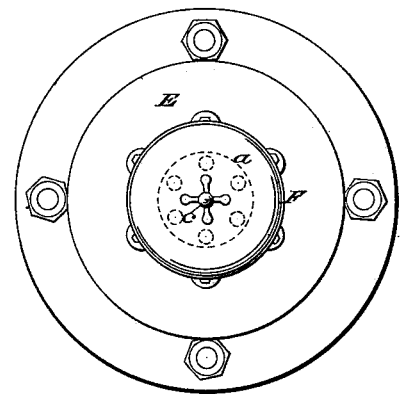

In the drawings which serve to illustrate the invention, Figure 1 is a vertical mid-section of the apparatus, and Fig. 2 is a plan of the same.

A is a cylinder, which may be open at its lower end or provided with a perforated cover. B is a packed plunger or piston fitted to and adapted to play in the cylinder.

C is the piston-rod, which passes through and is guided by the head D. To this piston-rod may be attached a treadle, if desired, or other mechanism, whereby the piston may be conveniently operated.

E is the upper cylinder-head, which is made, by preference, removable. Upon this is mounted a chamber, F, to receive the vessel or can from which the air is to be exhausted. This chamber is, by preference, made removable from the cylinder-head, so that it may be replaced by others of different shapes and sizes to fit the different sizes of the cans or vessels, as I deem it advisable that the said chambers should correspond very nearly, both in size and shape, to the vessels operated upon, so as to leave only a narrow passage or space for the air around said vessels.

G represents a can arranged in the chamber F in position to be operated upon.

The chamber F is provided with a cover, *a*, adapted to be hermetically closed by some suitable means. I have shown it provided with a flange or rim, which finds a seat upon a packing-ring upon a projecting rim on the chamber F; and I prefer that it should be held in place by atmospheric pressure alone; but it may be held down by other means. In this cover is a valvular opening, adapted to be closed by a ball-valve, *c*, which may be retained in place by means of an open cage, as shown; and this cage may also serve as a handle or grasp for lifting off the cover.

Holes *b b*, through the cover E, serve to form a communication between the chamber F and the cylinder A.

The operation is as follows: The piston B being pushed to the upper end of the cylinder, as shown, a can, G, is placed in the chamber F. On its top is first placed a packing-ring of rubber, or similar material, and a suitable lid or cover. The cover *a* is then put on and the piston B forced down. This exhausts the air from the vessel G and chamber F, the lid of the vessel rising freely to let the air escape. The ball *c* is then thrust aside, so as to admit the outer air upon the cover of the vessel, and the cover is immediately fixed in place by atmospheric pressure. The cover *a* may now be removed, the piston B again forced up, and the operation repeated indefinitely.

I consider the ball-valve *c* a very convenient device, for the purpose of closing the aperture in the cover *a*, as it is very easily removed from its seat; but it is obvious that other devices might be employed, as a rubber or leather pad upon the thumb, and I do not confine myself to the device as shown.

I claim—

1. The combination of the cylinder A, and piston and rod B C, with the chamber F, mounted on the cylinder A, and provided with a cover, *a*, having a valvular opening therein, substantially as and for the purposes set forth.

2. The combination of a chamber, F, provided with a cover arranged to be held in place by atmospheric pressure, and provided with a valvular opening and valve, *c*, with the cylinder A, and its piston and rod, substantially as and for the purposes set forth.

3. In combination with the cylinder A, provided with a suitable piston and rod, and a cover, E, having openings *b b*, a removable chamber, F, having cover *a*, having an opening controlled by a valve, and constructed substantially as shown, whereby chambers of various sizes and shapes may be employed interchangeably, for the purposes set forth.

In witness whereof I, the the said THOMAS GEORGE FONNEREAU DOLBY, have hereunto set my hand this 12th day of September, 1879.

T. G. F. DOLBY.

Witnesses:
E. H. JONEKAY,
THOMAS BAIRD.